(12) United States Patent
Buller

(10) Patent No.: US 9,290,130 B2
(45) Date of Patent: Mar. 22, 2016

(54) LOAD AND LIFT ROOF RACK

(71) Applicant: Paul Kevin Buller, Calgary (CA)

(72) Inventor: Paul Kevin Buller, Calgary (CA)

( * ) Notice: Subject to any disclaimer, the term of this patent is extended or adjusted under 35 U.S.C. 154(b) by 153 days.

(21) Appl. No.: 14/232,641

(22) PCT Filed: Oct. 30, 2012

(86) PCT No.: PCT/CA2012/001003
§ 371 (c)(1),
(2) Date: Jan. 14, 2014

(87) PCT Pub. No.: WO2013/063683
PCT Pub. Date: May 10, 2013

(65) Prior Publication Data
US 2014/0169918 A1 Jun. 19, 2014

Related U.S. Application Data

(60) Provisional application No. 61/554,854, filed on Nov. 2, 2011.

(51) Int. Cl.
B60R 9/042 (2006.01)
B60R 9/10 (2006.01)
B60P 1/48 (2006.01)

(52) U.S. Cl.
CPC .............. *B60R 9/042* (2013.01); *B60P 1/486* (2013.01); *B60R 9/10* (2013.01)

(58) Field of Classification Search
CPC .......... B60R 9/042; B60R 9/045; B60R 9/10; B60P 1/486; B60P 1/48
USPC ....................................................... 224/310
See application file for complete search history.

(56) References Cited

U.S. PATENT DOCUMENTS

| 4,015,726 | A | * | 4/1977 | Baker | ....................... B60P 1/48 212/261 |
| 5,062,760 | A | | 11/1991 | Samaniego | |
| 5,284,282 | A | | 2/1994 | Mottino | |
| 5,360,150 | A | | 11/1994 | Praz | |
| 5,423,650 | A | | 6/1995 | Zerbst et al. | |
| 5,544,796 | A | | 8/1996 | Dubach | |
| 5,782,391 | A | | 7/1998 | Cretcher | |
| 5,827,036 | A | * | 10/1998 | Steffes | .................. B60R 9/0426 224/310 |

(Continued)

FOREIGN PATENT DOCUMENTS

| CA | 1143704 | 3/1983 |
| CA | 1267642 | 4/1990 |

(Continued)

OTHER PUBLICATIONS

WIPO, International Search Report for International application No. PCT/CA2012/001003, Feb. 5, 2013.

(Continued)

*Primary Examiner* — Adam Waggenspack
(74) *Attorney, Agent, or Firm* — Siritzky Law, PLLC

(57) ABSTRACT

A roof rack for loading and unloading cargo to and from the roof of a motor vehicle is described. The roof rack is characterized by enabling the cargo to be loaded at an accessible height and then lifted onto the roof of the motor vehicle while the cargo is maintained in a fixed position. In another embodiment, the cargo is reoriented from a first orientation to a second orientation during the loading and unloading procedure.

23 Claims, 14 Drawing Sheets

(56) References Cited

U.S. PATENT DOCUMENTS

| | | | |
|---|---|---|---|
| 5,988,470 | A | 11/1999 | Siciliano |
| 6,015,074 | A | 1/2000 | Snavely et al. |
| 6,105,840 | A | 8/2000 | Trevino et al. |
| 6,279,801 | B1 | 8/2001 | Harrison |
| 6,428,263 | B1 | 8/2002 | Schellens |
| 6,634,529 | B2 | 10/2003 | Choiniere |
| 6,638,000 | B2 | 10/2003 | Groves |
| 7,048,490 | B2 | 5/2006 | Henderson |
| 7,226,266 | B2 | 6/2007 | Henderson et al. |
| 7,513,730 | B2 * | 4/2009 | Goyanko ............ B60R 9/042 224/310 |
| 2002/0179661 | A1 | 12/2002 | Choiniere et al. |
| 2007/0007316 | A1 | 1/2007 | Witczak |

FOREIGN PATENT DOCUMENTS

| | | |
|---|---|---|
| CA | 2034581 | 8/1991 |
| CA | 2097585 | 6/1992 |
| CA | 2074350 | 10/1993 |
| CA | 2095193 | 11/1993 |
| CA | 2081873 | 4/1994 |
| CA | 2144682 | 10/1995 |
| CA | 2198294 | 8/1997 |
| CA | 2209584 | 12/1998 |
| CA | 2219696 | 4/1999 |
| CA | 2177530 | 8/2002 |
| CA | 2434426 | 5/2004 |
| CA | 2447839 | 5/2004 |
| CA | 2447815 | 4/2005 |
| CA | 2551605 | 1/2007 |
| CA | 2540027 | 9/2007 |
| CA | 2596229 | 2/2008 |
| CA | 2344081 | 4/2008 |
| CA | 2450511 | 2/2009 |
| CA | 2643186 | 5/2009 |
| CA | 2447568 | 7/2011 |
| WO | WO 89/03324 | 4/1989 |
| WO | WO 2010/064233 | 6/2010 |

OTHER PUBLICATIONS

WIPO, Written Opinion of the International Search Authority for International application No. PCT/CA2012/001003, Feb. 5, 2013 [4 pgs.].

* cited by examiner

LOAD AND LIFT ROOF RACK

CROSS-REFERENCE TO RELATED APPLICATIONS

This application is a National Stage of International Application No. PCT/CA2012/001003, filed Oct. 30, 2012, which claims the benefit of U.S. Provisional Application No. 61/554,854, filed Nov. 2, 2011.

FIELD OF THE INVENTION

The present invention is directed to a roof rack for loading and unloading cargo to and from the roof of a motor vehicle or the like. In particular, the roof rack is characterized by enabling the load to be maintained in a fixed position throughout the loading and unloading procedure. In another embodiment, the cargo may be reoriented from a first orientation to a second orientation during the loading and unloading procedure.

BACKGROUND OF THE INVENTION

Transportation of cargo is a common requirement when travelling for both recreation and business. As is well known, common cargoes transported by people with their vehicles include luggage, skis, bikes, canoes, kayaks etc. Despite the common need to transport such items, the carrying capacity of motor vehicles without a roof-rack is typically limited to the available interior space of the vehicle. As such, due to the shape and size of various cargoes, many cargoes require a separate transporting apparatus to allow the motor vehicle to transport larger and/or more items than the interior space of the vehicle allows.

In the past, many different types of roof racks have been developed to provide a wide variety of means for transporting and storing cargo on the exterior of the vehicle. Roof racks typically attach to the roof of the vehicle via structural elements configured to the vehicle. The structural elements may include support rails or bars that extend along the length of the vehicle roof that may also include two or more crossbars extending across the width of the vehicle. Various attachments may be configured to the support rails and/or crossbars that are specifically adapted to connect the load to the roof rack. The crossbars may also be designed to adjust to the width of or beyond the width of the vehicle.

Cargo is then typically secured to a roof rack using the aforementioned accessories and/or straps that hold the cargo on the rails and/or crossbars. The position of the cargo is typically chosen by the user although it may be limited to a specific configuration based on the available attachment points on the roof rack or cargo.

Many vehicles are of significant height; particularly SUVs and minivans. This leads to vehicle roofs that are beyond the reach of the average or smaller person making the loading and unloading of cargo an often taxing or difficult procedure. As a result, personal injury can result when lifting heavy and/or awkward cargo to and from the roof of a vehicle. Similarly, damage to the vehicle or cargo can also occur. Individuals often attempt to overcome the height problem of many vehicles by attempting to balance on bumpers and/or the hood or the trunk of the vehicle in order to position or remove the cargo properly. Some individuals will also choose to carry small stepping systems within their vehicles which unnecessarily take-up space in the vehicle and can be dangerous to the person if they attempt to step up or down such a system with a heavy or awkward load. As such, there is a need for an apparatus that allows cargo to be loaded at a more accessible height and that overcomes the above mentioned problems.

The prior art illustrates various systems wherein design considerations have been directed towards convenience and functionality and have employed various arrangements in an attempt to provide ease-of-use to the end user. Typical designs include configurations that allow the user to lower and rotate the cargo to the side of the vehicle to assist in loading and unloading. For example, International publication WO 89/03324 discloses an apparatus including two lever arms mounted on a central staff centrally mounted on a supporting base to load cargoes onto and from the roof of a car and, United States Publication 2007/0007316 teaches a rotatable beam with foldable support arms for loading and unloading a bicycle to and from a car. Other designs improve on this functionality by allowing the cargo to be loaded to the side of the vehicle in a horizontal position and subsequently raised onto the vehicle in that same horizontal position. For example, U.S. Pat. No. 5,360,150 discloses a roof rack that employs a stantionary longitudinal element that allows the load to remain horizontal during operation; U.S. Pat. No. 5,544,796 discloses a roof rack comprising two parallel tracks having a roof section and an auxiliary section wherein the auxiliary section positions to extend outward and downward from the ends of the roof; U.S. Pat. No. 5,988,470 discloses a rack that employs a telescoping mechanism and a parallelogram mechanism that keep the cargoes horizontal during operation; U.S. Pat. No. 6,634,529 discloses cables on pivotable arms to load bicycles and other cargo onto the roof of a vehicle; U.S. Pat. No. 6,638,000 discloses a system for lifting and lowering bicycles from the roof of a vehicle including a lift arm with support brackets for holding the bicycle to a rotatable shaft member positioned on the roof of a vehicle; and, U.S. Pat. No. 7,513,730 teaches an apparatus for loading cargoes using horizontal frame members, a cargo carrying rack and cargo carrying arms pivotably and slidably attached to frame members.

Despite these various design efforts, there remains a need for roof rack systems that reduce the strength requirements of individuals to load or unload the roof rack, that minimize the risk of damage to a vehicle and the risk of injury to individuals. In addition, there remains a need for roof rack systems in which installation on the vehicle is also relatively simple.

SUMMARY OF THE INVENTION

In accordance with a first embodiment, the invention provides a load and lift roof rack for loading and unloading cargo to and from a vehicle comprising: a base rail for attachment to the vehicle, the base rail having a first base rail end and a second base rail end; a lever bar having a first lever bar end and a second lever bar end, the first lever bar end operably and pivotably connected to the first end of the base rail at a pivot point; an arm bar having a first arm bar end and a second arm bar end, the first arm bar end operably and pivotably connected to the second lever bar end; a base gear fixed to the first end of the base rail; an arm gear fixed to the first end of the arm bar; connection means operably connecting the base gear and the arm gear wherein pivotable movement of the lever arm with respect to the base rail maintains the arm bar in a fixed orientation with respect to the base rail during movement of the lever arm between a loading and a transport position.

In further embodiments, the lever arm pivots from a downward orientation through a vertical orientation to a horizontal orientation when moving from the loading to transport positions.

In another embodiment, an actuation means is operably connected to the base rail for assisting in the movement of the lever arm from the loading position to the transport position and vice versa.

In another embodiment, the actuation means is a hydraulic or pneumatic cylinder with a first end attached to the base rail and a second end attached to a lever operably connected to the lever arm for assisting in moving the lever arm.

In another embodiment, the actuation means includes a worm gear operably connected to the lever arm and a worm shaft operably connected to the base rail.

In further embodiments, the actuation means is manually actuable.

In another embodiment, the actuation means is electrically actuable.

In yet another embodiment, the connection means is a continuous chain connecting the base gear and the arm gear.

In still further embodiments, the load and lift roof rack includes two or more operative and interconnected sets of the base rail, lever arm and arm bar.

In further embodiments, the arm gear and base gear are different sizes such that pivotable movement of the lever arm with respect to the base rail allows the arm bar to vary in orientation with respect to the base rail during movement of the lever arm between the loading and the transport position.

In further embodiments, the arm bar includes at least one load carrying rail.

In another embodiment, the lever moves a total of approximately 270 degrees between the loading and transport positions and wherein maximum torque is applied to the lever when the lever arm is substantially horizontal.

In another embodiment, the connection means is a belt.

BRIEF DESCRIPTION OF THE DRAWINGS

The invention is described with reference to the drawings in which.

DETAILED DESCRIPTION OF THE INVENTION

Figure 2:
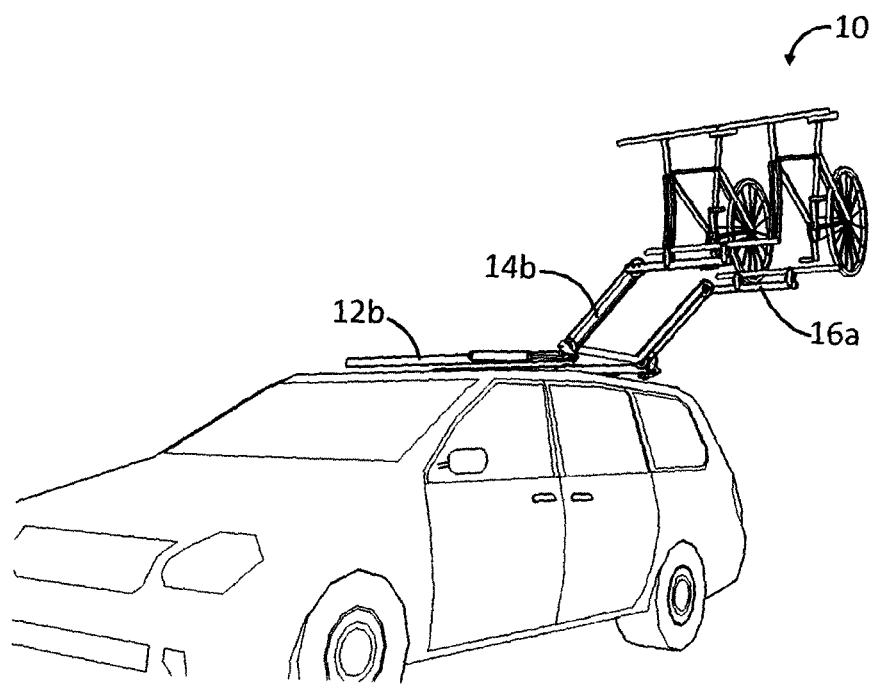
FIG. 2 is a perspective view of one embodiment of the invention showing the load and lift roof rack in a halfway position.
Figure 3:
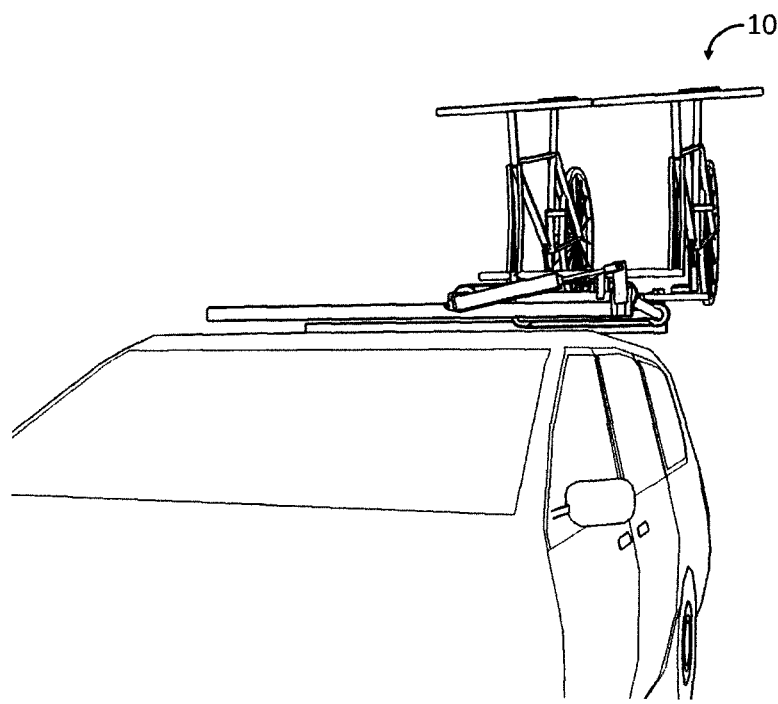
FIG. 3 is a perspective view of one embodiment of the invention showing the load and lift roof rack in a transport position.

As shown in the Figures, the invention generally relates to a roof rack (10) for transferring cargo to and from the roof of a vehicle (11) wherein a load (eg. bicycles) are transferred from a loading position (FIG. 1) through a halfway position (FIG. 2) to a transport position (FIG. 3). When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
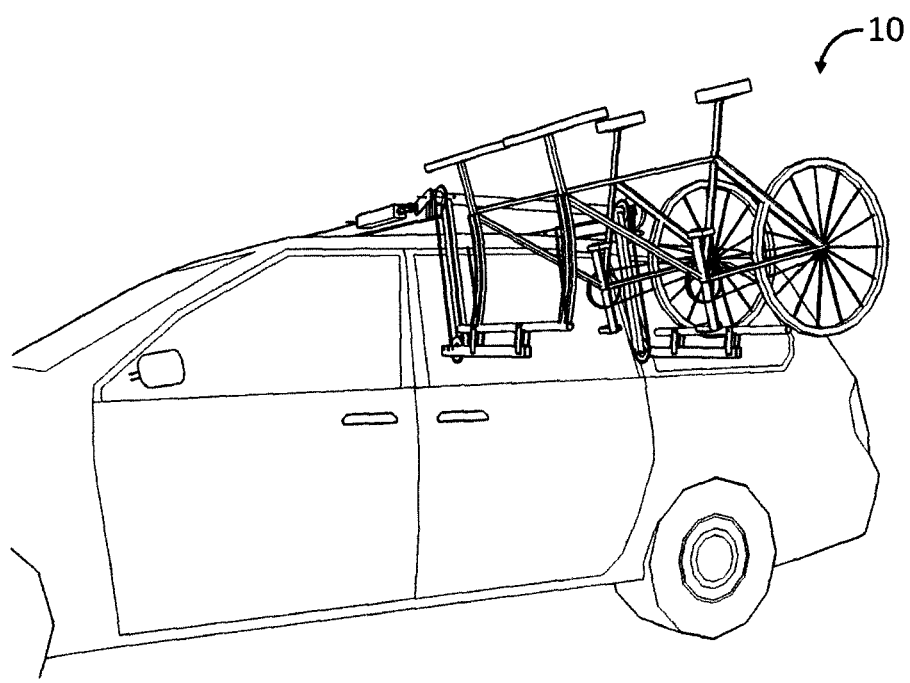
FIG. 1 is a perspective view of one embodiment of the invention showing the load and lift roof rack in a loading position.

More specifically, in accordance with the invention, there is provided a roof rack (10) for transferring cargo to and from the roof of a vehicle (11) (FIGS. 1-3). As shown in FIGS. 4-8, the roof rack (10) includes base rails (12a,12b) for attachment to the vehicle, lever bars (14a, 14b) pivotably coupled to the base rails via pivot points (30a, 30b), and arm bars (16a, 16b) pivotably attached to the lever bars. In the context of this description, while a pair of each of the base rails, lever bars and arm bars is described, it is understood that different embodiments having more than two operative units of the base rails, lever bars and arm bars are considered. As well, embodiments having a single operative unit of a base rail, lever bar and arm bar are also considered.

Figure 12:
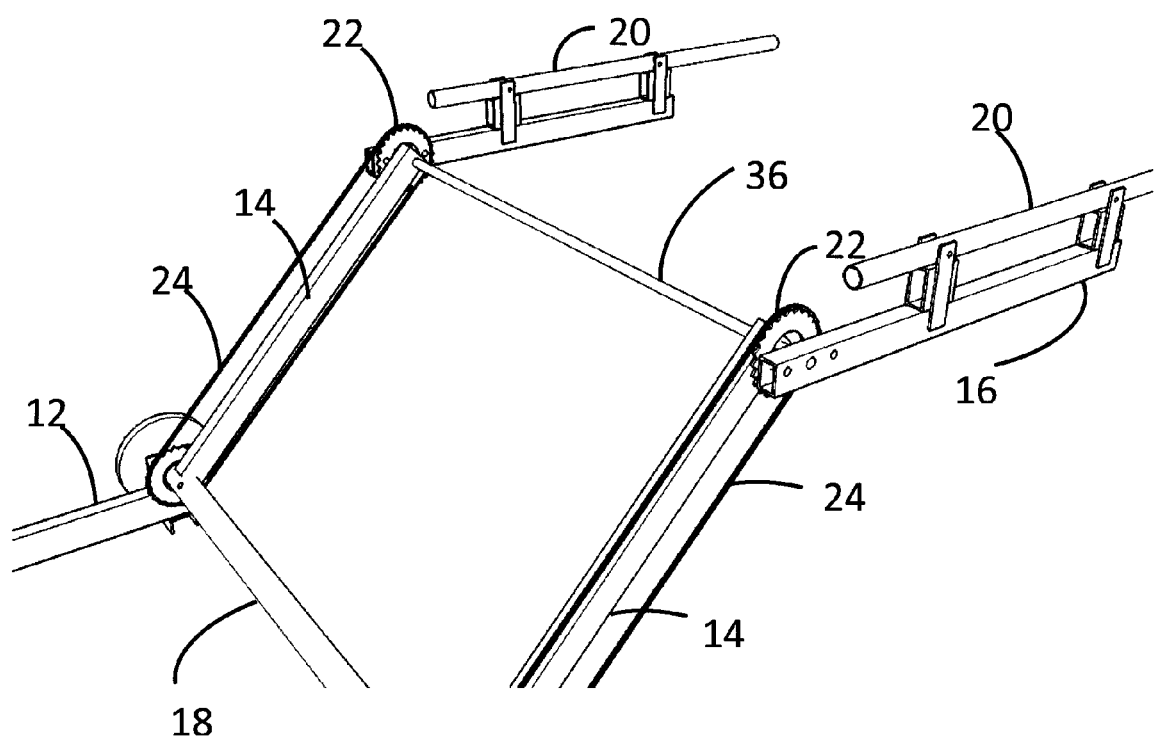
FIG. 12 is a schematic representation of one embodiment of the invention showing a stabilizing bar.

As shown in FIG. 12, the roof rack (10) can also include at least one stabilizing bar (36) fixed to the lever bars (14a, 14b) or arm bars (16a, 16b) for stiffening and stabilizing the roof rack (10).

The arm bars (16a, 16b) move to and from a transport position as shown in FIG. 3 and a loading position as shown in FIG. 1. Importantly, in a preferred embodiment, the arm bars remain in a fixed orientation during the entire loading and unloading operation of the roof rack relative to the base rails. For example, the orientation of the cargo when the roof rack (10) is in the loading position (FIG. 1) is the same as the orientation of the cargo when the roof rack is in the transport position (FIG. 3). In other words, the arms bars generally remain parallel to the base rails throughout loading or unloading.

The orientation of the cargo is maintained by means of the specific configuration of the apparatus including a set of fixed gears attached to the various structural elements of the roof rack (10), and connection means between the fixed gears. More specifically, the lever bars (14a, 14b) rotate about the pivot points (30a, 30b) operatively attached to the base rails (12a, 12b), and are driven by an actuation means (28a, 28b) (described in greater detail below). A set of base gears (26a, 26b) are fixed relative to the base rails (12a, 12b) and as such the base gears do not rotate during operation of the roof rack (10). A set of arm gears (22a, 22b) are fixed to the arm bars (16a, 16b) such that the angle of the arm bars relative to the ground is determined by the orientation of the arm gears. The orientation of the arm gears is maintained by connection means (24a, 24b) such as a chain or belt that interconnect respective arm gears and base gears. Importantly, during the transition to and from the transport and loading positions, the arm gears (22a, 22b) will rotate relative to the lever bars (14a, 14b) by virtue of the connection means (24a, 24b) forcing the arm gears to rotate. Since the arm bars (16a, 16b) are fixed to the arm gears (22a, 22b), the orientation of the arm bars is maintained in a fixed (preferably horizontal) position throughout the entire loading or unloading operation of the roof rack (10).

In various embodiments of the invention, the movement of the base gear is controlled or assisted by an actuation system that initiates and/or controls movement of the base gear to effect the loading and unloading operations.

Figure 4A:
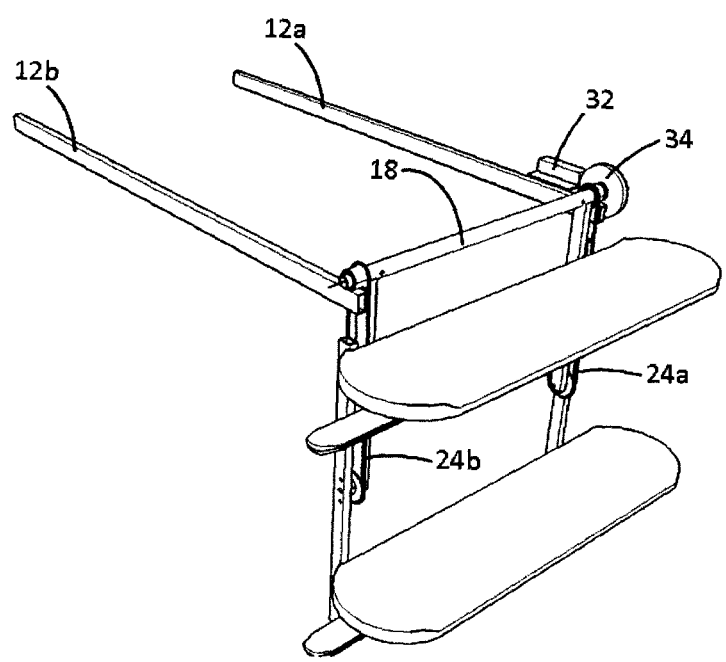
FIG. 4a is a perspective view of one embodiment of the invention showing the load and lift roof rack in a loading position with the cargo in a horizontal orientation.
Figure 4B:
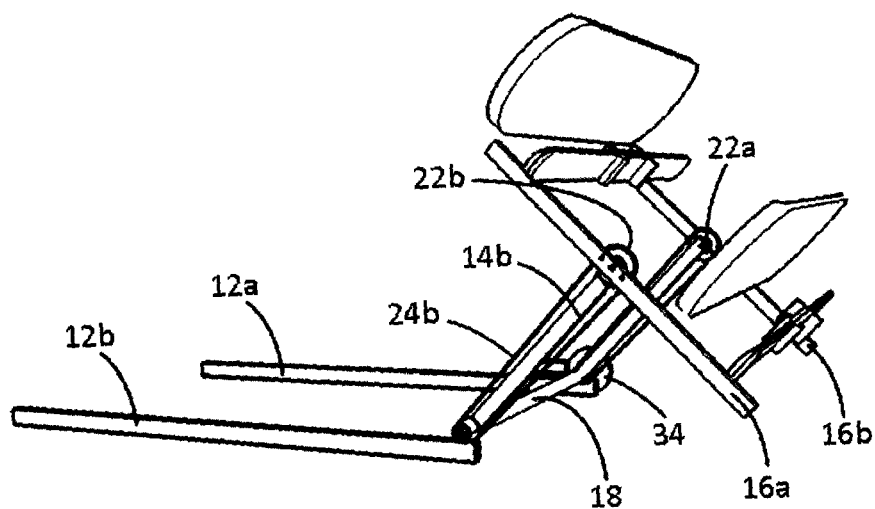
FIG. 4b is a perspective view of one embodiment of the invention showing the load and lift roof rack in the partially extended position.
Figure 4C:
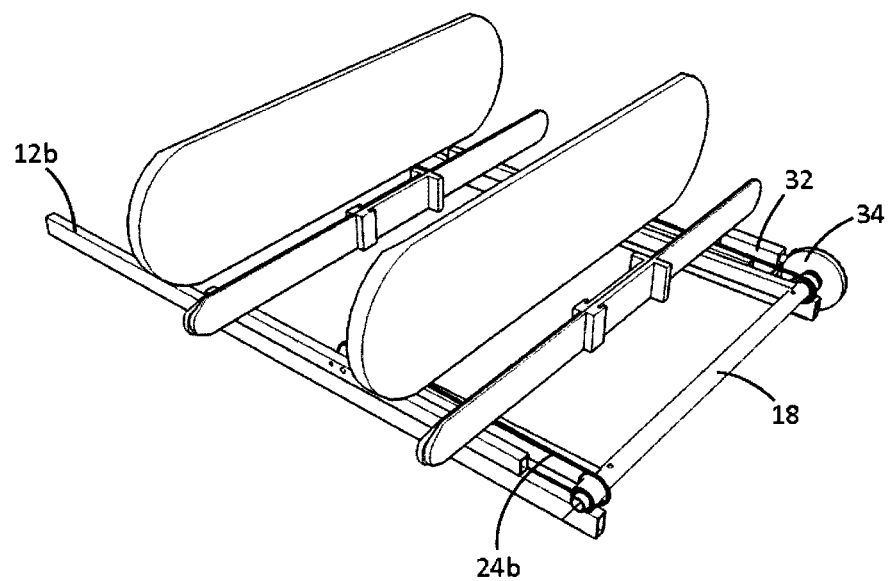
FIG. 4c is a perspective view of one embodiment of the invention showing the load and lift roof rack in the transport position with the cargo in a vertical orientation.
Figure 5:
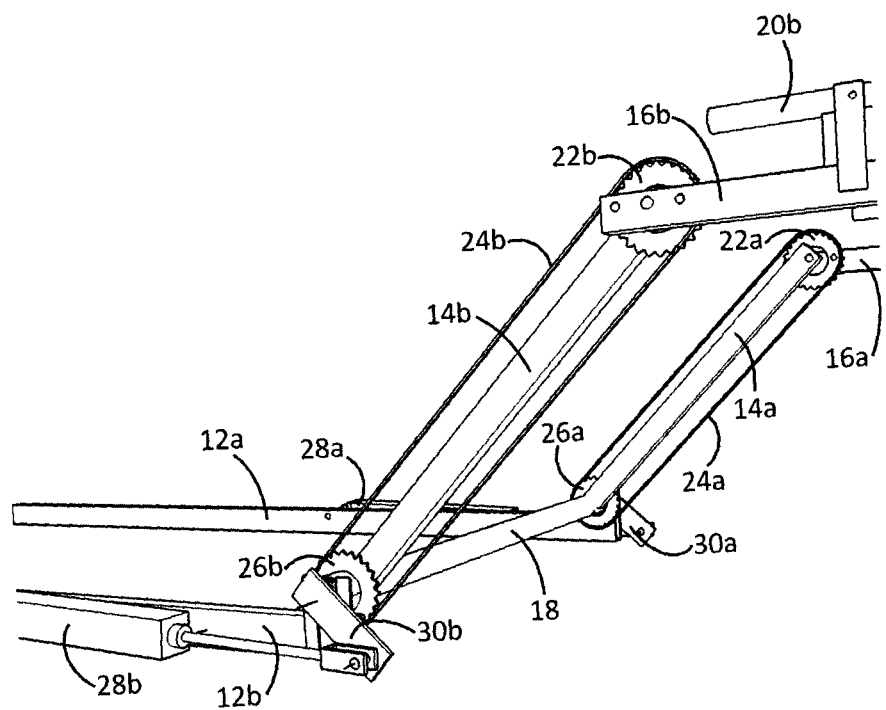
FIG. 5 is an isometric view of one embodiment of the invention in the partially extended position showing base rails, lever bars and arm bars.
Figure 6:
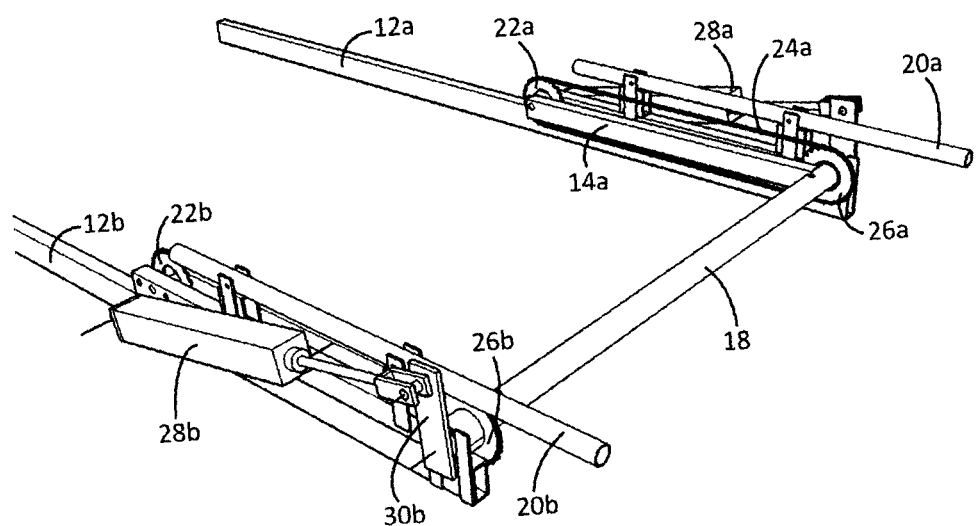
FIG. 6 is an isometric view of one embodiment of the invention in the transport and fully collapsed position.
Figure 7:
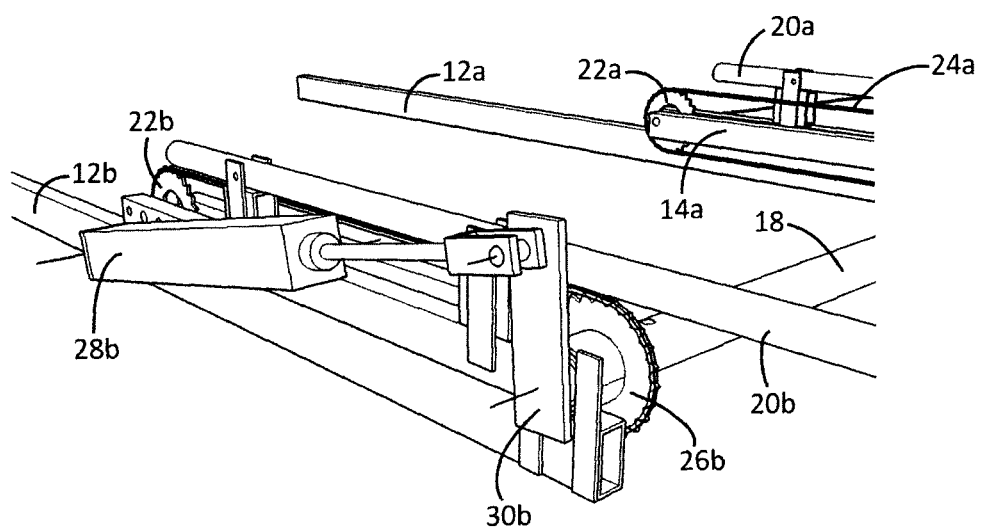
FIG. 7 is an isometric view of one embodiment of the invention in the fully collapsed position showing an actuation means.
Figure 8:
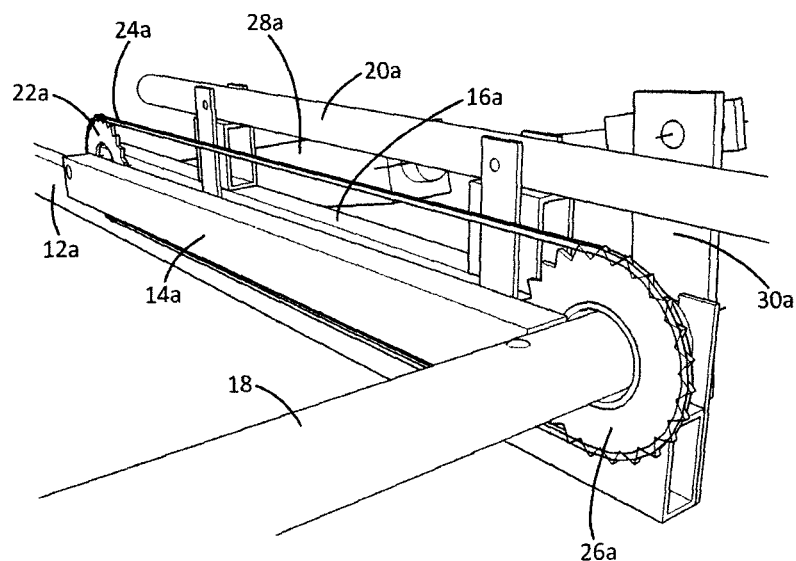
FIG. 8 is an isometric view of one embodiment of the invention in the transport position showing a connection means with a schematic representation of a base gear and arm gear.
Figure 9:
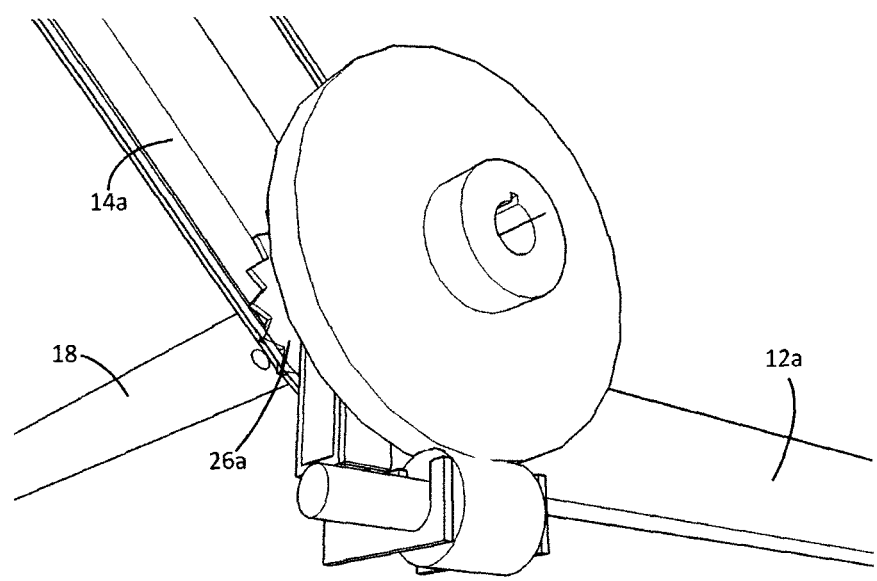
FIG. 9 is a schematic representation of one embodiment of the invention in the halfway position showing a base gear and worm gear.

In one embodiment, hydraulic pistons (28a, 28b) serve as an actuation means that drive control levers (30a, 30b) such that the lever bars (14a, 14b) rotate relative to the base rails (12a, 12b). Rotation about a crossbar (18) causes the lever bars (14a, 14b) to transition up-and-over the roof of the vehicle when the roof rack (10) is in operation. As best shown in FIGS. 1, 4 and 5, the control levers operate through an approximately 270 degree arc from the loading (FIG. 1) to transport positions (FIG. 6) that corresponds to a 270 degree rotation of the lever arms. Preferably, the orientation of the control levers relative to the lever bar/crossbar is such that the hydraulic pistons deliver maximum torque to the lever bar/crossbar at a position where maximum torque due to the load is being exerted on the lever bar/crossbar. Typically, at the point of maximum torque the lever bars extend horizontally relative to the ground. As such, it is preferred that the control levers be positioned such that the actuation cylinders provide a force at effectively 90 degrees to the control lever at the point of maximum torque.

In one embodiment, roller chains operate as the connection means (24a, 24b) and operatively engage with the teeth on the base gears (26a, 26b) and arm gears (22a, 22b). In this embodiment, as the lever bars (14a, 14b) rotate about the crossbar (18), the roller chains engage the gears such that the tension in the roller chains is constant resulting in a fixed orientation of the arm gears (22a, 22b) and arm bars (16a, 16b).

Figure 10:
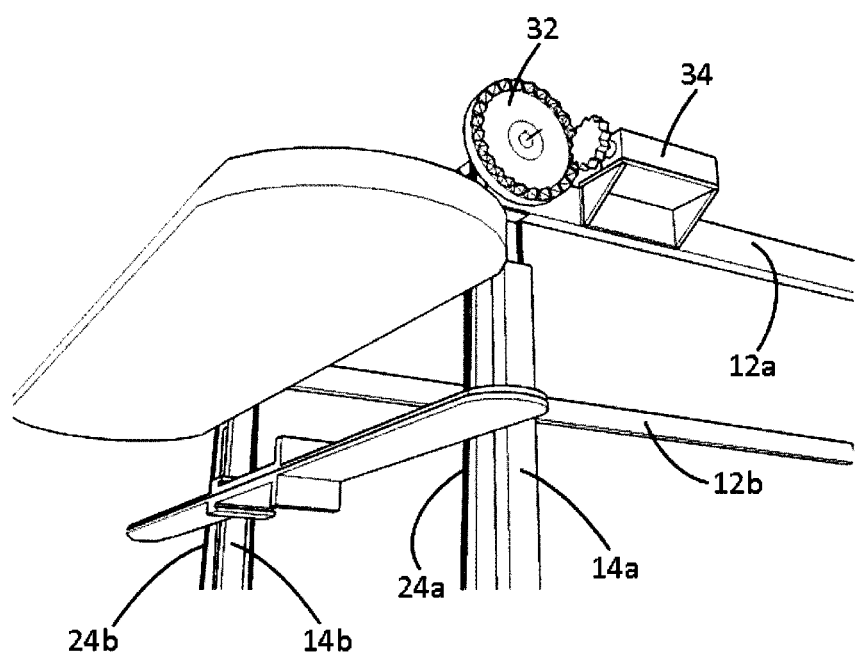
FIG. 10 is a schematic representation of one embodiment of the invention in the halfway position showing a schematic representation of a bevel gear and drive motor.
Figure 11:
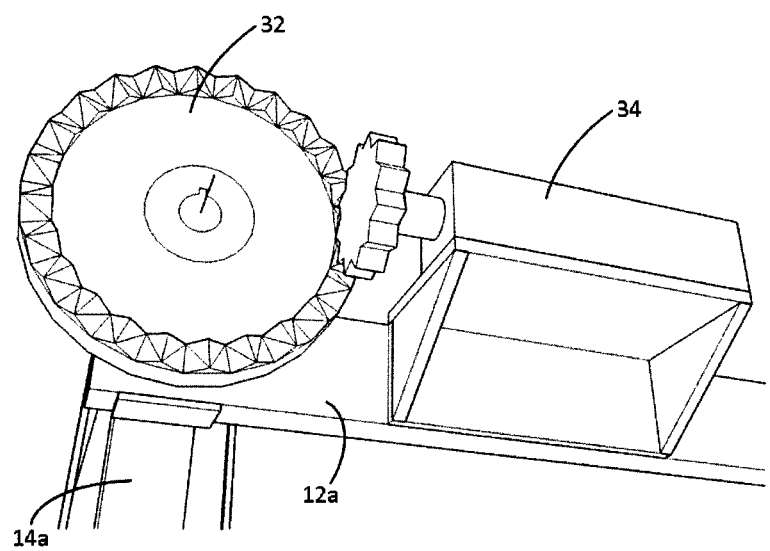
FIG. 11 is a schematic representation of a bevel gear and drive motor.

Other actuation means can be used such as a worm-gear assembly that may include a manual hand crank and/or an electrically driven motor. A number of types of gears in varying combinations can also be used including worm, rack and pinion, ring, helical, face, hypoid, bevel, spiral and screw gears as known to those skilled in the art. Different types of connection means are also possible such as cable and pulley systems. As an example, FIGS. 10 and 11 show a bevel gear (32) with a drive motor (34) fixed to one of the base rails (12a, 12b). Actuation of the drive motor causes rotation of the bevel gear which, in turn, causes rotation of the crossbar (18).

The operation of the system from the loading to transport position is now described in greater detail. On a typical vehicle, the roof rack (10) starts in the loading position shown in FIG. 1. The arm bars (16a, 16b) rest at approximately waist or chest level to facilitate easy loading of the cargo. Cargo is fixed to holding bars (20a, 20b) or some other attachment means that are in turn attached to the arm bars (16a, 16b). For the purposes of illustration, FIG. 5 shows the arm bars as tubular structures but they could include a variety of shapes and sizes to facilitate easy and secure attachment of the cargo as known to those skilled in the art. Once the cargo has been loaded in the desired orientation, the actuation means (28a, 28b) with or without user assistance, initiates movement of the control levers causing the arm bars (16a, 16b) to lift the cargo towards the roof of the vehicle in an up-and-over motion. The connection means (24a, 24b) ensure the arm gears (22a, 22b) and arm bars (16a, 16b) maintain a horizontal orientation of the cargo and that the transport position of the cargo has the same orientation as the loading position of the cargo. In the example where the actuation system is a hydraulic cylinder, the hydraulic cylinders will assist or control lifting of the load until the lever arms are vertical whereupon they will assist slowing or controlling the lowering of the load to the transport position.

The system operates in reverse from the transport position to the loading position. In this case, actuation means (28a, 28b) drive the control levers causing the arm bars (16a, 16b) to lift up-and-over the roof of the vehicle and move the cargo to the loading position where it may be unloaded by the user. As with loading, the orientation of the cargo is preserved throughout the entire unloading operation of the roof rack (10).

In other embodiments, the gear ratio between the base gears and arm gears may be varied wherein the orientation of the cargo is varied between the loading and transport positions. For example, it may be more convenient that a cargo is loaded in a horizontal position but transported in a vertical position on the vehicle so as to minimize the amount of vehicle width being utilized. In this case, after loading and movement towards the transport position, the arm bar moves between a horizontal and vertical position. For example, FIGS. 4a, 4b and 4c show the roof rack with a varied gear ratio between the base gears (26a, 26b) and the arm gears (22a, 22b). In FIG. 4a, the roof rack is in the loading position with the cargo in a horizontal orientation. As the roof rack is actuated the arm bars rotate about the lever bars as a result of the varied gear ratio. For example, FIGS. 4a, 4b and 4c show the base gears with a smaller diameter than the arm gears. This difference in size causes the arm gears to rotate relative to the lever arms, as opposed to staying fixed as is the case when the base gears and arm gears have the same diameter. When the roof rack reaches the transport position the cargo is in a vertical orientation (FIG. 4c).

The roof rack may also be provided with protective shrouds around the gears and chains (or other connection systems) to minimize the risk of foreign objects (eg. loose clothing or fingers) getting caught in the various moving components.

Load Discussion

In operation, load is transferred to the lever bars (14a, 14b) and the arm gears (22a, 22b) of the roof rack (10) via a combination of the vertical load directed onto the apparatus and the torque applied to the arm gears. Torque is transferred through the arm gears (22a, 22b) and down to the base rails (12a, 12b). The lever reaction force ($F_R$) is the load (L) applied to the roof rack (10) (Equation 1). The torque on the arm gears can be calculated as the gear reaction moment ($M_R$) that is transferred through the lever bars (14a, 14b) and down to the base rails (12a, 12b). The load on a single arm bar of the roof rack (10) is calculated as the product of the load (L) applied to the roof rack (10) and the length (l) to the center of gravity (approximated here as the length of one of the arms) (16a, 16b) (Equation 2).

$$F_R = L \qquad\qquad 1$$

$$M_R = Ll \qquad\qquad 2$$

The center of gravity of the load is distal to the point where the arm bars (16a, 16b) and lever bars (14a, 14b) connect, causing the moment to be carried entirely at this connection point. The connector load ($L_C$) is a function of the gear reaction moment ($M_R$) caused by the load, and the radii of a single arm gear ($R_G$) on one of the arm bars (16a, 16b) (Equation 3).

$$L_C = \frac{M_R}{R_G}. \qquad 3$$

The crossbar (18) distributes the load between the lever bars (14a, 14b). The base reaction force ($F_B$) in the vertical direction is equal to the lever reaction force ($F_R$) (Equation 4) in the vertical direction. A driver reaction moment ($M_{DR}$) can be calculated for a single side of the apparatus as the product of the lever reaction force ($F_R$), the length of a single lever bar ($l_2$), along with the angle of rotation (Equation 5). Since the load is always acting vertically, the moment acting on the actuation means (28a, 28b) changes as the angle of rotation ($\phi$) changes. The load is ultimately transferred to attachments points on the vehicle roof that attach the base rails (12a, 12b) to the vehicle.

$$F_B = F_R \qquad 4$$

$$M_{DR} = F_R \times l_2 \times \sin(\phi) \qquad 5$$

The sum of moments ($M_S$) is calculated as shown in Equation 6 where ($F_B$) is the base reaction force, ($l_2$) is the length of a single lever, ($M_{DR}$) is the driver reaction moment, and ($M_R$) is the gear reaction moment. The reaction forces on attachment points 1 and 2 ($F_{P1}$ and $F_{P2}$ respectively) are calculated as shown in Equations 7 and 8.

$$M_S = F_B \times D2 + M_{DR} + M_R. \qquad 6$$

$$F_{P1} = \frac{-M_S}{D3}. \qquad 7$$

$$F_{P2} = L - F_{P1}. \qquad 8$$

The attachment points can be either manufacturer installed rails or aftermarket attachments.

As will be apparent to those skilled in the art, various modifications, adaptations and variations of the foregoing specific disclosure can be made without departing from the scope of the invention claimed herein.

The invention claimed is:

1. A load and lift roof rack for loading and unloading cargo to and from a vehicle comprising:
    base rail for attachment to the vehicle, the base rail having a first base rail end and a second base rail end;
    lever bar having a first lever bar end and a second lever bar end, the first lever bar end operably and pivotably connected to the first end of the base rail at a pivot point allowing the lever bar to pivot between a loading position and a transport position;
    an arm bar for operative support of the cargo, the arm bar having a first arm bar end and a second arm bar end, the first arm bar end operably and pivotably connected to the second lever bar end;
    a base gear fixed to the first end of the base rail;
    an arm gear fixed to the first end of the arm bar for rotating the arm bar with respect to the lever bar;
    connection means operably connecting the base gear and the arm gear for maintaining or changing the orientation of the arm gear with respect to the base gear and base rail, wherein a gear ratio of the base gear to the arm gear determines the orientation of the arm bar with respect to the base rail during movement of the lever bar between the loading position and the transport position.

2. The load and lift roof rack as in claim 1 further comprising an actuation means operably connected to the base rail for assisting in the movement of the lever bar from the loading position to the transport position and vice versa.

3. The load and lift roof rack as in claim 2 wherein the actuation means includes a worm gear operably connected to the lever bar and a worm shaft operably connected to the base rail.

4. The load and lift roof rack as in claim 3 wherein the actuation means is manually actuable.

5. The load and lift roof rack as in claim 3 wherein the actuation means is electrically actuable.

6. The load and lift roof rack system as in claim 2 wherein the actuation means is a hydraulic or pneumatic cylinder with a first end attached to the base rail and a second end attached to a lever operably connected to the lever bar for assisting in moving the lever bar.

7. The load and lift roof rack as in claim 6 wherein the lever moves a total of approximately 270 degrees between the loading and transport positions and wherein maximum torque is applied to the lever when the lever bar is substantially horizontal.

8. The load and lift roof rack as in claim 2 wherein the actuation means comprises a drive motor fixed to the base rail and operatively connected to the base gear for rotating the base gear.

9. The load and lift roof rack as in claim 8 wherein the base gear is a bevel gear.

10. The load and lift roof rack as in claim 1 wherein the gear ratio is 1:1 and the arm bar is maintained in a fixed orientation with respect to the base rail during movement between the loading and the transport position.

11. The load and lift roof rack as in claim 10 wherein the arm bar is oriented generally parallel to the base rail in the loading position, in the transport position, and during movement between the loading and the transport position.

12. The load and lift roof rack as in claim 1 wherein the base gear is smaller than the arm gear, enabling the arm bar to rotate with respect to the base rail as the lever bar moves between the loading and the transport position.

13. The load and lift roof rack as in claim 12 wherein in the loading position the arm bar is generally oriented at 90 degrees to the base rail, and in the transport position the arm bar is generally parallel to the base rail.

14. The load and lift roof rack as in claim 1 wherein the lever bar pivots from a downward orientation through a vertical orientation to a horizontal orientation when moving from the loading to the transport position.

15. The load and lift roof rack as in claim 1 wherein the connection means is a continuous chain connecting the base gear and the arm gear.

16. The load and lift roof rack as in claim 1 wherein the load and lift roof rack includes two or more operative and interconnected sets of the base rail, lever bar and arm bar.

17. The load and lift roof rack as in claim 1 wherein the arm gear and base gear are different sizes such that pivotable movement of the lever bar with respect to the base rail allows the arm bar to vary in orientation with respect to the base rail during movement of the lever bar between the loading and the transport position.

18. The load and lift roof rack as in claim 1 wherein the arm bar includes at least one load carrying rail for supporting the cargo.

19. The load and lift roof rack as in claim 1 further comprising a protective guard operatively connected to the connection means to at least partially cover connection means components.

20. The load and lift roof rack as in claim 1 wherein the center of the base gear is coaxial with the pivot axis of the lever bar.

21. The load and lift roof rack as in claim 1 wherein the center of the arm gear is coaxial with the pivot axis of the arm bar.

22. The load and lift roof rack as in claim 1 further comprising a stabilizing bar connected to the lever bar and/or the arm bar.

23. A load and lift roof rack for loading and unloading cargo to and from a vehicle comprising:
- base rail for attachment to the vehicle, the base rail having a first base rail end and a second base rail end;
- lever bar having a first lever bar end and a second lever bar end, the first lever bar end operably and pivotably connected to the first end of the base rail at a pivot point allowing the lever bar to pivot between a loading position and a transport position;
- an arm bar for operative support of the cargo, the arm bar having a first arm bar end and a second arm bar end, the first arm bar end operably and pivotably connected to the second lever bar end;
- a base gear fixed to the first end of the base rail;
- an arm gear fixed to the first end of the arm bar for rotating the arm bar with respect to the lever bar; and
- a continuous chain or belt operably connecting the base gear and the arm gear, said continuous chain or belt constructed and adapted to maintain or change the orientation of the arm gear with respect to the base gear and the base rail, wherein a gear ratio of the base gear to the arm gear determines the orientation of the arm bar with respect to the base rail during movement of the lever bar between the loading position and the transport position.

* * * * *